United States Patent
Kuravangi-Thammaiah et al.

(10) Patent No.: US 12,301,559 B2
(45) Date of Patent: May 13, 2025

(54) SYSTEMS AND METHODS FOR SERVICE AUTHORIZATION IN A DELEGATED DISCOVERY DEPLOYMENT

(71) Applicant: Verizon Patent and Licensing Inc., Basking Ridge, NJ (US)

(72) Inventors: Shanthala Kuravangi-Thammaiah, Keller, TX (US); Hossein M. Ahmadi, Parsippany, NJ (US); Vinod Kumar Choyi, Conshohocken, PA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 208 days.

(21) Appl. No.: 18/150,354

(22) Filed: Jan. 5, 2023

(65) Prior Publication Data
US 2024/0236080 A1  Jul. 11, 2024

(51) Int. Cl.
*H04L 9/40* (2022.01)

(52) U.S. Cl.
CPC ................................. *H04L 63/083* (2013.01)

(58) Field of Classification Search
CPC .................... H04L 63/083; H04L 63/0807; H04L 63/0884
See application file for complete search history.

(56) References Cited

U.S. PATENT DOCUMENTS

| | | | |
|---|---|---|---|
| 2022/0191028 A1* | 6/2022 | Aggarwal | H04L 9/3247 |
| 2023/0027515 A1* | 1/2023 | Lee | H04W 12/069 |

* cited by examiner

*Primary Examiner* — Brian F Shaw (57) ABSTRACT

In some implementations, a service communication proxy (SCP) network function device may receive, from a first network function device, a service request associated with a second network function device. The SCP network function device may transmit an access token request to a network repository function (NRF) network function device. The SCP network function device may receive, based on the access token request, an access token associated with the first network function device. The SCP network function device may transmit the service request to the second network function device, wherein the service request is transmitted to the second network function device with an indication of the access token.

20 Claims, 6 Drawing Sheets

| Scope | Description |
|---|---|
| "nudr-dr" | Access to the Nudr DataRepository API. |
| "nudr-dr:subscription-data" | Access to the SubscriptionData data set. |
| "nudr-dr:subscription-data:authentication-subscription:read" | Access to read the AuthenitcationSubscription resource of the SubscriptionData data set. |
| "nudr-dr:subscription-data:authentication-subscription:modify" | Access to update the AuthenticationSubscription resource of the SubscriptionData data set. |
| "nudr-dr:subscription-data:registrations:write" | Write access to NF registration resources of the SubscriptionData data set. |
| "nudr-dr:policy-data" | Access to the PolicyData data set. |
| "nudr-dr:exposure-data" | Access to the ExposureData data set. |
| "nudr-dr:application-data" | Access to the ApplicationData data set. |

SYSTEMS AND METHODS FOR SERVICE AUTHORIZATION IN A DELEGATED DISCOVERY DEPLOYMENT

BACKGROUND

In a fifth generation (5G) core network, a network function device in the wireless network may discover and obtain user data from other network function devices, such as a user data repository (UDR) network function device and/or a unified data management (UDM) network function device in order to establish a session for a user device. The user data may include information such as which services are enabled for the user device, what the subscriptions of the user device are, and/or other user data.

DETAILED DESCRIPTION OF EXAMPLE EMBODIMENTS

The following detailed description of example implementations refers to the accompanying drawings. The same reference numbers in different drawings may identify the same or similar elements.

Network function discovery in a core network of a wireless network may include determining which services of a network function device a subscriber is authorized to access. A first network function device (referred to as a "consumer") may enlist the services of a second network function device (referred to as a "producer") in order to provide services to a user device associated with the subscriber. Before accessing the services of the producer, an authorization procedure is performed for the consumer so that the consumer can determine whether the consumer is authorized to access the services of the producer, and to determine which services of the producer the consumer is authorized to access. The consumer may obtain an access token from a network repository function (NRF) network function device. The access token enables the consumer to discover and access authorized services of the producer.

A core network may include many network function devices. Thus, each network function device in the core network may need to consume many resources (e.g., processing resources, memory resources, storage resources, networking resources) obtaining and storing access tokens. The resource consumption may continue to increase as more granular authorization controls are implemented, as new client credential scopes are added for producers, and/or as additional network function devices are added to the core network, among other examples.

Some implementations described herein provide systems and methods for service authorization in a delegated discovery deployment. In some implementations described herein, a service communication proxy (SCP) network function device in a core network of a wireless network manages and performs service authorization for network function devices in the core network. The SCP network function device obtains access tokens and routes of access tokens on behalf of consumers (e.g., network function devices that obtain services from other network function devices) in a highly centralized manner. The SCP network function device may also maintain a repository of authorization information (e.g., access tokens, information identifying authorized services, and/or other authorization information) for the network function devices in the core network instead of the network function devices (network functions that operate as consumers) individually storing the access tokens in a decentralized manner.

In this way, performing service authorization and maintaining access tokens in a centralized manner at the SCP network function device reduces resource consumption (e.g., processing resources, memory resources, storage resources, networking resources) of the network function devices in the core network that would otherwise be consumed in obtaining and storing the access tokens. The conservation of resources increases as more granular authorization controls are implemented, as new client credential scopes are added for producers, and/or as additional network function devices are added to the core network, among other examples.

Figure 1:
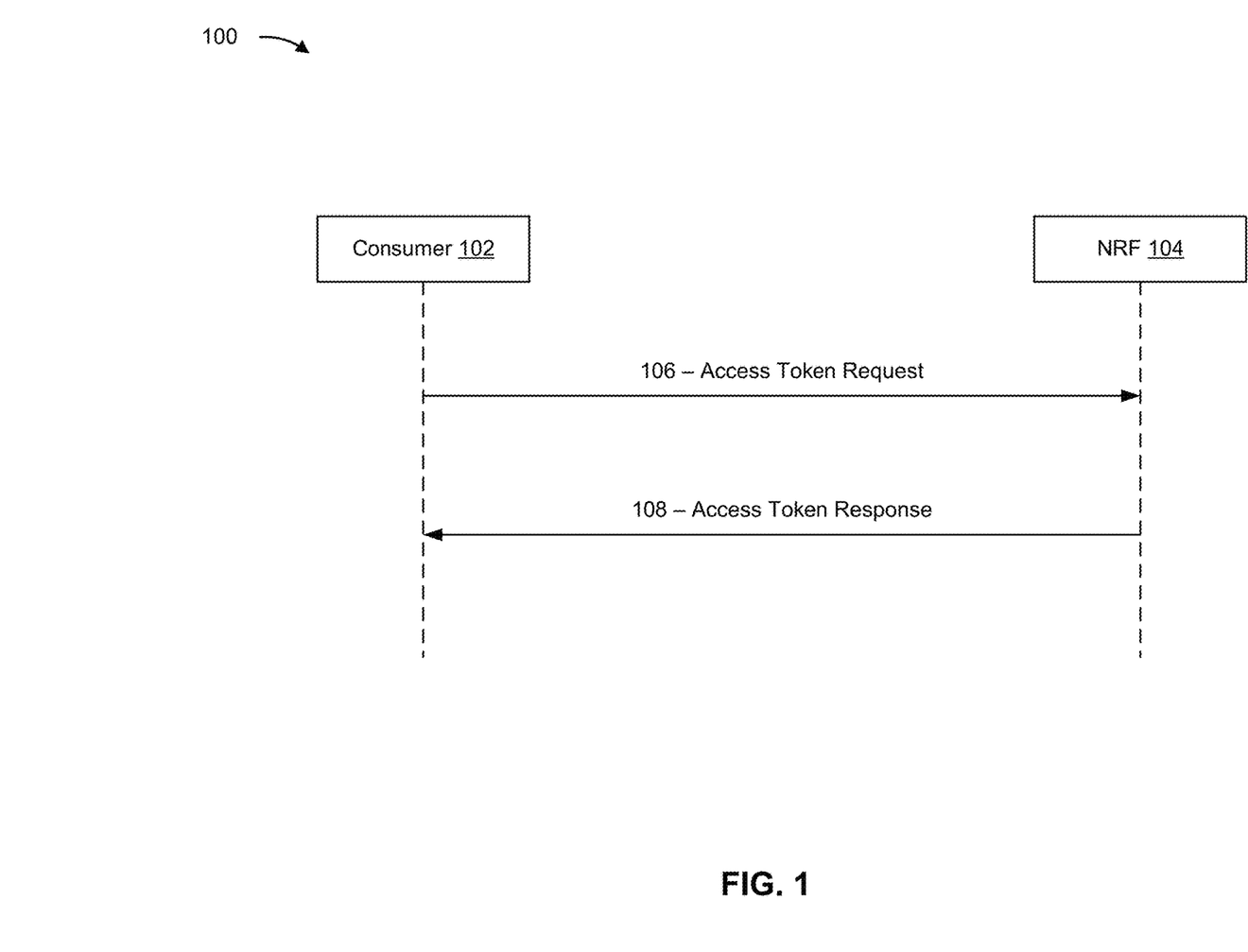
FIG. 1 is a diagram of an example associated with service authorization.

FIG. 1 is a diagram of an example 100 associated with service authorization. As shown in FIG. 1, example 100 includes a consumer 102 and an NRF network function device (referred to as the NRF 104), among other examples. The consumer 102 includes a network function device in a core network, such as an access and mobility management function (AMF) network function device, a session management function (SMF) network function device, another type of network function device described herein, and/or another type of network function device. The consumer 102 and the NRF 104 may be included in a core network (e.g., a fifth generation (5G) core network or another type of core network) of a wireless network (e.g., a 5G wireless network or another type of wireless network). The core network may include a plurality of network function devices that communicate with the NRF 104 to discover other network function devices, to discover the services provided by the other network function devices, and/or to obtain access tokens for obtaining service authorization from the other network function devices, among other examples.

As shown in FIG. 1, at 106, the consumer 102 may transmit an access token request to the NRF 104. The NRF 104 may receive the access token request. The consumer 102 may transmit the access token request to the NRF 104 on an Nnrf 5G network function interface or another type of network function interface.

The access token request may be a request to provide the consumer 102 with an access token that the consumer 102 can use to access services of another network function device in the core network that the consumer 102 is authorized to access. The access token request may be issued using a POST command (e.g., a POST/oauth2/token request) in an AccessTokenReq message (e.g., an Nnrf_AccessToken_GetRequest message) or another type of access token request communication. The access token request may include an indication of an identifier (e.g., a network function (NF) instance identifier) associated with the consumer 102, the network function device(s) that the consumer 102 is attempting to access, and/or an indication of the "scope"

of the access that is requested, among other examples. Examples of service authorization scopes are illustrated and described in connection with FIG. 3.

As further shown in FIG. 1, at 108, the NRF 104 may provide the access token to the consumer 102 in an access token response. The consumer 102 may receive the access token response, including the access token, from the NRF 104. The access token response may include an AccessTokenRsp message or another type of access token response message. Alternatively, if the NRF 104 cannot validate the access token request, the NRF 104 may transmit (and the consumer 102 may receive) a 400 Bad Request message or another type of message indicating an access token error (e.g., AccessTokenErr) or a message indicating "unauthorized access" that results in the NRF 104 being unable to provide the access token.

The access token may include an open authorization 2.0 (oAuth2) or another type of access token. The access token represents the authorization to access resources and/or subset of services (e.g., the services of network function devices or producers). The NRF 104 may generate the access token to include an identifier (e.g., an NF instance identifier) associated with the NRF 104, an identifier (e.g., an NF instance identifier) associated with the consumer 102, and NF type of the network function device(s) (producers) that the consumer 102 is expected to access, and/or the expected scope (or names of services that the consumer 102 is expected to access), among other examples. In some implementations, the NRF 104 generates the access token such that the access token is compliant with a standard, such as a JSON Web Token that is compliant with an IETF RFC 7519/7515 group of standards. In some implementations, the NRF 104 may digitally sign the access token.

The consumer 102 may then use the access token to discover services of one or more network function devices, request services from one or more network function devices, and/or to perform other operations.

As indicated above, FIG. 1 is provided as an example. Other examples may differ from what is described with regard to FIG. 1. The number and arrangement of devices shown in FIG. 1 is provided as an example. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2:
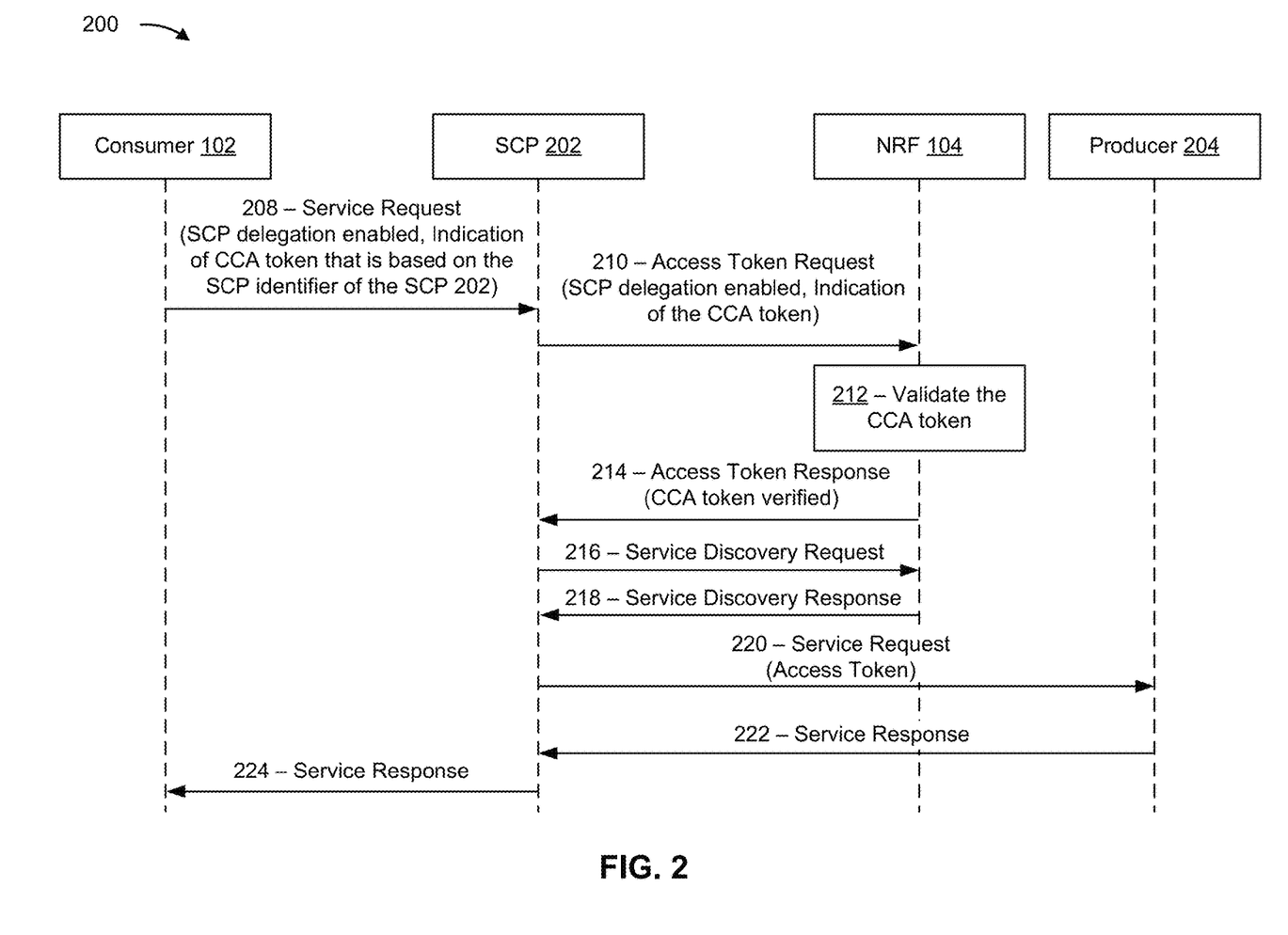
FIG. 2 is a diagram of an example associated with service authorization.

FIG. 2 is a diagram of an example 200 associated with service authorization. As indicated above, a core network may include many network function devices. Thus, each network function device in the core network may function as a consumer 102 in obtaining authorization information for accessing services from many other network function devices and storing the authorization information. This may result in consumption of many resources (e.g., processing resources, memory resources, storage resources, networking resources) of the network function devices.

To conserve resources (e.g., processing resources, memory resources, storage resources, networking resources) of consumers 102 in a core network, the core network may include an SCP network function device (referred to as the SCP 202) that manages and performs service authorization for network function devices in the core network. The SCP 202 manages and performs discovery and routing of access tokens for consumers 102 in a highly centralized manner. The SCP 202 may also maintain a repository of authorization information (e.g., access tokens, information identifying authorized services, and/or other authorization information) for the consumers 102 in the core network, instead of the network function devices individually storing the authorization information in a decentralized manner. In this way, performing service authorization and maintain authorization information in a centralized manner at the SCP 202 reduces resource consumption (e.g., processing resources, memory resources, storage resources, networking resources) of the consumers 102 in the core network that would otherwise be consumed in obtaining authorization information from many other network function devices and storing the authorization information.

As shown in FIG. 2, example 200 includes a consumer 102, an NRF 104, the SCP 202, and a producer 204, among other examples. The producer 204 includes a network function device in a core network, such as an AMF network function device, an SMF network function device, another type of network function device described herein, and/or another type of network function device. The consumer 102, the NRF 104, the SCP 202, and the producer 204 may be included in a core network (e.g., a 5G core network or another type of core network) of a wireless network (e.g., a 5G wireless network or another type of wireless network).

The core network may include a plurality of network function devices that communicate with the SCP 202. The SCP 202 manages the authorization and discovery of other network function devices, to discover the services provided by the other network function devices, and/or to obtain access tokens for obtaining service authorization from the other network function devices, among other examples. This may be referred to as a "Model D" 5G signaling network model. In this particular 5G signaling network model, the SCP 202 functions as a centralized routing hub. The SCP 202 provides indirect communication between the network function devices in the core network and provides delegated discovery for the network function devices. In other words, requests for discovery of other network function devices, that are typically provided directly to the NRF 104 by network function devices in the core network, are handled by the SCP 202. This enables load balancing in the core network to be unified, enables real-time delivery of network function requests and responses, and/or enables optimized capacity in the core network, among other examples. An example of a Model D 5G signaling network model deployment is illustrated and described in connection with FIG. 4.

Reference numbers 208-224 in the example 200 in FIG. 2 represent a service authorization and access procedure in a Model D 5G signaling network model deployment. In the service authorization and access procedure, the SCP 202 manages the access tokens and other authorization information for consumers 102 in the core network. The SCP 202 coordinates with the NRF 104 to obtain access tokens, and coordinates with producers 204 to obtain authorization information, on behalf of consumers 102. In some implementations, the service authorization and access procedure illustrated in FIG. 2 may be performed as part of a network function discovery procedure in the core network.

At 208 in FIG. 2, the consumer 102 may transmit a service request to the SCP 202. The SCP 202 may receive the service request from the consumer 102. The consumer 102 may transmit the service request to the SCP 202 on an Nscp 5G network function interface. The service request may include a request to discover services offered by a producer 204, a result to obtain a service from a producer 204, and/or another type of request. An example service request may include a Get/nudm-sdm/service request, which may be a request to retrieve subscription data, associated with a user device, that is relevant to the consumer 102. However, other types of service requests are within the scope of the present disclosure.

The service request may include various types of information. For example, the service request may include a 3gpp_oAuth2Token message (e.g., a message that indicates that an oAuth2 token is to be generated). This type of service request is sent by the consumer 102 to the NRF 104 via the SCP 202.

As another example, the service request may include an indication that service authorization for the consumer 102 is delegated to the SCP 202 (SCP delegation enabled). In some implementations, the indication that service authorization for the consumer 102 is delegated to the SCP 202 may include a flag that is set in the service request (e.g., Delegated_SCP=set). In some implementations, the indication that service authorization for the consumer 102 is delegated to the SCP 202 may include a particular value in a field in the service request.

As another example, the service request may include an indication of a client credentials assertion (CCA) token or another type of consumer token associated with the consumer 102. The CCA token may be a signed token that is generated by the consumer 102. The CCA token may be used to permit indirect communications via the SCP 202 such that authentication can be achieved in an end-to-end manner between the consumer 102 and the producer 204 or between the consumer 102 and the NRF 104 via the SCP 202. In some implementations, the consumer 102 may generate the CCA token to be compliant with a standard, such as a JSON Web Token that is compliant with an IETF RFC 7519 standard and based on 3GPP TS 33.501 specifications. In some implementations, the consumer 102 may digitally sign the CCA token.

The consumer 102 may generate the CCA token based on the SCP 202. In particular, the consumer 102 may generate the CCA token to include an SCP identifier associated with the SCP 202. The SCP identifier may include an NF instance identifier associated with the SCP 202, an SCP fully qualified domain name (FQDN) associated with the SCP 202, and/or another type of SCP identifier.

Including the SCP identifier in the CCA token of the consumer 102 enables the NRF 104 to validate that the SCP 202 is authorized by the consumer 102 to provide access token requests on behalf of the consumer 102. In this way, including the SCP identifier in the CCA token increases security in the core network in that SCPs and/or other network function devices cannot obtain access tokens from the NRF 104 without an indication of approval/authorization from the consumer 102.

The consumer 102 may generate the CCA token to include other types of information (e.g., in addition to the identifier associated with the SCP 202). For example, the consumer 102 may generate the CCA token to include an NF instance identifier associated with the consumer 102. As another example, the consumer 102 may generate the CCA token to include a timestamp. As another example, the consumer 102 may generate the CCA token to include an expiration time. As another example, the consumer 102 may generate the CCA token to include a network function target associated with the service request (e.g., an NF identifier associated with the producer 204). It may also include in the CCA token, the purpose of delegation (e.g. obtain authorization token), duration of delegation (e.g. 3600 seconds) along with the identifier of the SCP 202, which is then by the consumer 102 to the NRF 104 via the SCP 202.

At 210 in FIG. 2, the SCP 202 may transmit an access token request to the NRF 104 on behalf of the consumer 102. The NRF 104 may receive the access token request from the SCP 202. The SCP 202 may transmit the access token request to the NRF 104 on an Nnrf 5G network function interface or another type of network function interface. The SCP 202 may transmit the access token request based on receiving the service request from the consumer 102. In some implementations, the SCP 202 may transmit the access token request based on determining that the service request includes the indication that SCP delegation is enabled.

The access token request may be a request to provide the SCP 202 with an access token that the SCP 202 can use to obtain services from the producer 204 on behalf of the consumer 102. The access token request may be issued using a POST command (e.g., a POST/oauth2/token request) in an AccessTokenReq message (e.g., an Nnrf_AccessToken_GetRequest message) or another type of access token request communication.

The access token request may include the indication that service authorization for the consumer 102 is delegated to the SCP 202 (SCP delegation enabled). In some implementations, the indication that service authorization for the consumer 102 is delegated to the SCP 202 may include a flag that is set in the access token request (e.g., Delegated_SCP=set). In some implementations, the indication that service authorization for the consumer 102 is delegated to the SCP 202 may include a particular value in a field in the access token request. The access token request may further include the indication of the CCA token received from the consumer 102 in the service request.

At 212 in FIG. 2, the NRF 104 may validate the CCA token included in the access token request. The NRF 104 may validate the CCA token prior to generating the access token and providing the access token to the SCP 202 to satisfy the access token request. The NRF 104 may validate the CCA token based on determining that the access token request includes the indication that service authorization for the consumer 102 is delegated to the SCP 202 (SCP delegation enabled). The NRF 104 may validate the CCA token based on determining that the access token request includes the indication that service authorization for the consumer 102 is delegated to the SCP 202 to verify that the access token request includes an indication that the consumer 102 has delegated service authorization to the SCP 202. In this way, the NRF 104 may verify that the access token request is a genuine request from the SCP 202 and authorized by the consumer 102, and is not a fraudulent request from an attacker or unauthorized network function device.

In some implementations, the NRF 104 may validate the access token request (and the CCA token) by determining that the access token request is from the SCP 202 and validating the access token request (and the CCA token) based on determining that the access token request is from the SCP 202.

In some implementations, the NRF 104 may validate the access token request (and the CCA token) by determining that the access token request is from the SCP 202 and determining that the CCA token includes the SCP identifier associated with the SCP 202. The NRF 104 may validate the access token request (and the CCA token) based on determining that the access token request is from the SCP 202 and based on determining that the CCA token includes the SCP identifier associated with the SCP 202.

In some implementations, the NRF 104 may validate the access token request (and the CCA token) by determining that the access token request includes the indication that service authorization for the consumer 102 is delegated to the SCP network function device. The NRF 104 may determine, based on determining that the access token request includes the indication that service authorization for the consumer 102 is delegated to the SCP 202, that the access token request is from the SCP 202. The NRF 104 may determine, based on determining that the access token request includes the indication that service authorization for the consumer 102 is delegated to the SCP 202, that the CCA token includes an SCP identifier associated with the SCP 202. The NRF 104 may validate the access token request (and the CCA token) based on determining that the access token request is from the SCP 202 and based on determining that the CCA token includes the SCP identifier associated with the SCP 202.

In some implementations, the NRF 104 uses other techniques to validate the access token request and/or the CCA token included in the access token request.

The NRF 104 may validate the authenticity of the CCA token by verifying the digital signature included in the CCA by using the public key within the digital certificate of the consumer 102 that has been sent as part of the CCA. The digital certificate of the consumer 102 also has a unique identifier that is associated with the consumer 102. If the NRF 104 determines that the digital signature is valid and if the CCA has not expired, then the NRF 104 checks the authorization policies. If the consumer 102 based on the identifier or the network function type has been authorized to access services provided by the producer 204, then an access token is generated.

At 214 in FIG. 2, the NRF 104 may transmit the access token to the SCP 202 in an access token response. The SCP 202 may receive the access token response, including the access token associated with the consumer 102, from the NRF 104. The NRF 104 may transmit the access token response to the SCP 202 on an Nscp 5G network function interface and/or another type of network function interface. The access token response may include an AccessTokenRep message or another type of access token response message. The access token response may include an AccessTokenRep message or another type of access token response message. Alternatively, if the NRF 104 cannot validate the access token request, the NRF 104 may transmit (and the consumer 102 may receive) a 400 Bad Request message or another type of message indicating an access token error (e.g., AccessTokenErr) that results in the NRF 104 being unable to provide the access token.

The NRF 104 may generate the access token based on receiving the access token request, and/or based on validating the CCA token indicated in the access token request. The access token may include an oAuth2 or another type of access token. The access token represents the authorization to access resources (e.g., service(s)) of the producer 204. The NRF 104 may generate the access token to include an identifier (e.g., an NF instance identifier) associated with the NRF 104, an identifier (e.g., an NF instance identifier) associated with the consumer 102, an NF type of the network function device(s) (producers) that the consumer 102 is expected to access, and/or the expected scope (or names of services that the consumer 102 is expected to access), among other examples. In some implementations, the NRF 104 generates the access token such that the access token is compliant with a standard, such as a JSON Web Token that is compliant with an IETF RFC 7519 standard. In some implementations, the NRF 104 may digitally sign the access token.

The SCP 202 may store (e.g., may cache) the access token, associated with the consumer 102, in a data structure of the SCP 202. For example, the SCP 202 may store the access token in an electronic file, in an electronic file folder, in an electronic file system, in a database, in a memory device, in a storage device, and/or in another type of data structure. The SCP 202 may retain the access token in the data structure until expiration of the access token. Retaining the access token at the SCP 202 enables the SCP 202 to satisfy subsequent service requests from the consumer 102 without having to perform the operations described in connection with 210-214. This reduces latency in satisfying the subsequent service requests and conserves resources (e.g., processing, memory, and/or networking resources) of the SCP 202 and the NRF 104 in that fewer access token requests are transmitted and validated.

At 216 in FIG. 2, the SCP 202 may discover services of the producer based on receiving the access token associated with the consumer 102. The SCP 202 may transmit, to the NRF 104, a service discovery request on behalf of the consumer 102. The NRF 104 may receive the service discovery request from the SCP 202. The SCP 202 may transmit the service discovery request to the NRF 104 on an Nnrf 5G network function interface and/or another type of network function interface.

The service discovery request may be based on the service request received from the consumer 102 at 208. For example, the SCP 202 may transmit a Get/nnrf-disc/service-names message to the NRF 104 to discover the service(s) of the producer 204 indicated in the service request that was transmitted by the consumer 102 at 208.

At 218 in FIG. 2, the NRF 104 may transmit a service discovery response to the SCP 202. The SCP 202 may receive the service discovery response. The NRF 104 may transmit the service discovery response based on receiving the service discovery request. The NRF 104 may transmit the service discovery response to the SCP 202 on an Nscp 5G network function interface and/or another type of network function interface.

The service discovery response may include a network function profile associated with the producer. The network function profile may include a list of services that are offered by the producer 204. In some implementations, network function profile includes a list of only the services of the producer 204 that the consumer 102 is authorized to access.

At 220 in FIG. 2, the SCP 202 may transmit the service request to the producer 204. The producer 204 may receive the service request from the SCP 202. The service request may include an indication of the service(s) requested by the consumer 102 in the service request received at 208. Moreover, the service request may include an indication of the access token associated with the consumer 102. In this way, the access token is provided as a means to verify that the consumer 102 is authorized to access the requested services of the producer 204.

The producer 204 may determine the services that are requested in the service request. The producer 204 may determine, based on the access token, whether the consumer 102 is authorized to access the services. For example, the producer 204 may determine whether the expiration time, indicated in the access token, has expired based on the timestamp in the access token. If the expiration time has not tolled, the producer 204 may determine whether the services requested by the consumer 102 are included in the access token. If the producer 204 determines that the services requested by the consumer 102 are included in the access token, the producer 204 may perform the services. The Producer 204 validates the authenticity of the access token and ensures that the SCP identifier included the CCA token is the same SCP that had forwarded the service request. The producer 204 then provides a service response intended to the consumer 102. The SCP 202 may also include the CCA token that was sent by the consumer 102 along with the access token generated by the NRF 104, provided the CCA token has not expired.

At 222 in FIG. 2, the producer 204 may transmit a service response to the SCP 202. The SCP 202 may receive the service response. The producer 204 may transmit the service response to the SCP 202 on an Nscp network function interface and/or another type of network function interface. The service response may include the result of the services performed by the producer 204. Additionally and/or alternatively, the service response may be the services performed by the producer 204.

At 224 in FIG. 2, the SCP 202 may forward the service response to the consumer 102 to satisfy the service request that was received by the SCP 202 at 208.

As indicated above, FIG. 2 is provided as an example. Other examples may differ from what is described with regard to FIG. 2. The number and arrangement of devices shown in FIG. 2 is provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
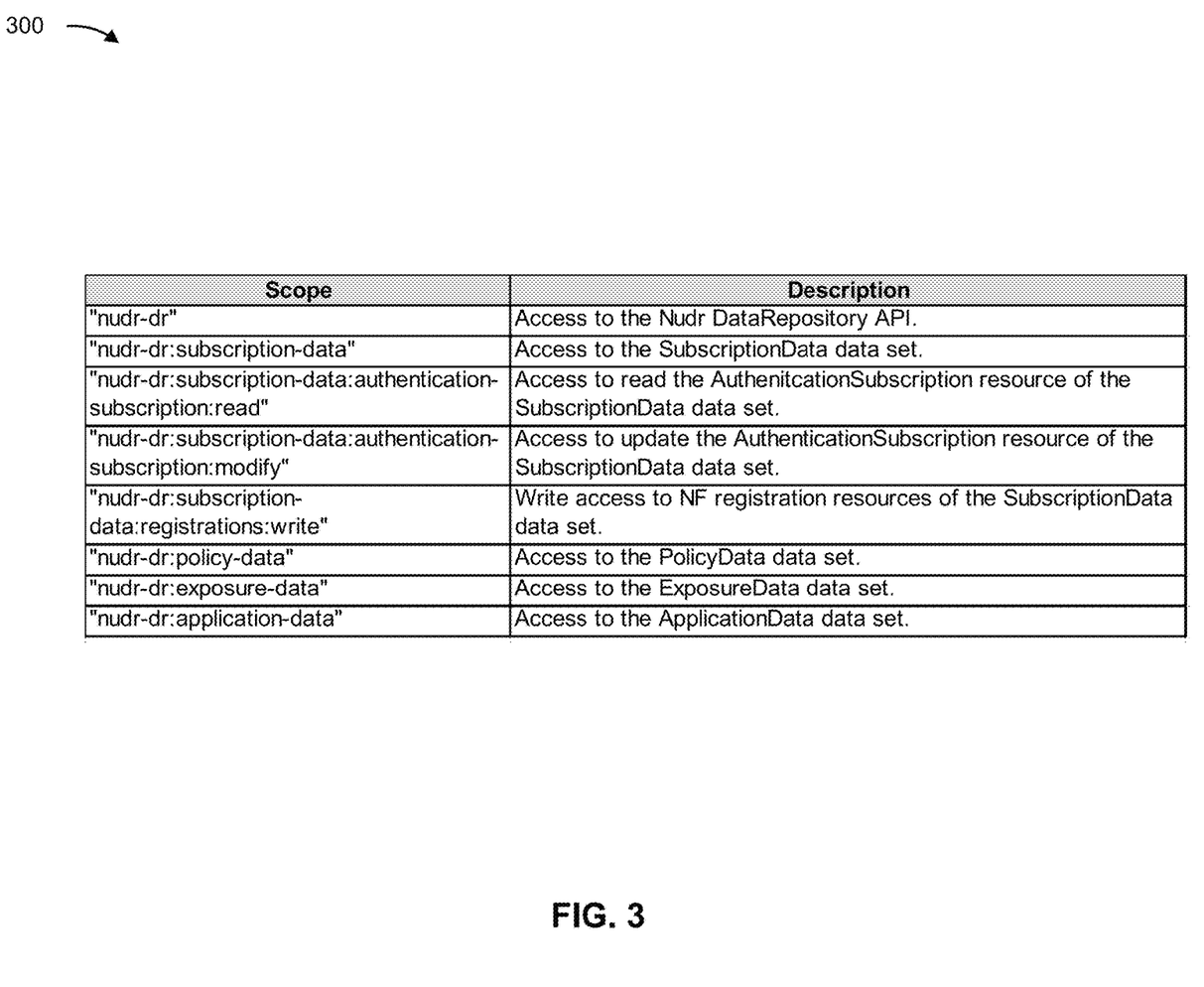
FIG. 3 is a diagram of example service authorization access messages.

FIG. 3 is a diagram of an example 300 of service authorization access messages. A producer 204 may provide one or more of the service authorization access messages in the example 300 to an SCP 202 in a service response, such as the example service response at 222 in in the example 200 of FIG. 2.

A service authorization access message may indicate one or more types of access actions or oAuth2 scopes that are authorized for use by a consumer 102. The producer 204 may provide one or more of the service authorization access messages in the example 300 based on an access token, associated with the consumer 102, provided by the SCP 202 in a service request, such as a service request 220 in the example 200 of FIG. 2. The service authorization access messages in the example 300 may be defined and/or stored in a repository, such as a repository in a UDR network function device, and may be accessed by a producer 204 using an application programming interface (API) such as an Nudr_DataRepository API.

As shown in FIG. 3, an example authorization access message may include an "nudr-dr" authorization access message. In some implementations, the producer 204 may provide the "nudr-dr" authorization access message to the SCP 202 to indicate that a consumer 102 is permitted to access the Nudr_DataRepository API of a UDR network function device.

As further shown in FIG. 3, another example authorization access message may include an "nudr-dr: subscription-data" authorization access message. In some implementations, the producer 204 may provide the "nudr-dr: subscription-data" authorization access message to the SCP 202 to indicate that a consumer 102 is permitted to access a SubscriptionData data set (e.g., stored in a UDR network function device).

As further shown in FIG. 3, another example authorization access message may include an "nudr-dr:subscription-data:authentication-subscription:read" authorization access message. In some implementations, the producer 204 may provide the "nudr-dr:subscription-data:authentication-subscription:read" authorization access message to the SCP 202 to indicate that a consumer 102 is granted access to read an AuthenticationSubscription resource of the SubscriptionData data set (e.g., stored in a UDR network function device).

As further shown in FIG. 3, another example authorization access message may include an "nudr-dr:subscription-data:authentication-subscription:modify" authorization access message. In some implementations, the producer 204 may provide the "nudr-dr:subscription-data:authentication-subscription:modify" authorization access message to the SCP 202 to indicate that a consumer 102 is granted access to modify an AuthenticationSubscription resource of the SubscriptionData data set (e.g., stored in a UDR network function device).

As further shown in FIG. 3, another example authorization access message may include an "nudr-dr:subscription-data:registrations:write" authorization access message. In some implementations, the producer 204 may provide the "nudr-dr:subscription-data:registrations:write" authorization access message to the SCP 202 to indicate that a consumer 102 is granted write access to network function registration resources of a SubscriptionData data set (e.g., stored in a UDR network function device).

As further shown in FIG. 3, another example authorization access message may include an "nudr-dr:policy-data" authorization access message. In some implementations, the producer 204 may provide the "nudr-dr:policy-data" authorization access message to the SCP 202 to indicate that a consumer 102 is permitted to access a PolicyData data set (e.g., stored in a UDR network function device).

As further shown in FIG. 3, another example authorization access message may include an "nudr-dr:exposure-data" authorization access message. In some implementations, the producer 204 may provide the "nudr-dr:exposure-data" authorization access message to the SCP 202 to indicate that a consumer 102 is permitted to access an ExposureData data set (e.g., stored in a UDR network function device).

As further shown in FIG. 3, another example authorization access message may include an "nudr-dr:application-data" authorization access message. In some implementations, the producer 204 may provide the "nudr-dr:application-data" authorization access message to the SCP 202 to indicate that a consumer 102 is permitted to access an ApplicationData data set (e.g., stored in a UDR network function device).

As indicated above, FIG. 3 is provided as an example. Other examples may differ from what is described with regard to FIG. 3. Moreover, a producer 204 may provide other types of authorization access messages than those illustrated and described in connection with FIG. 3.

Figure 4:
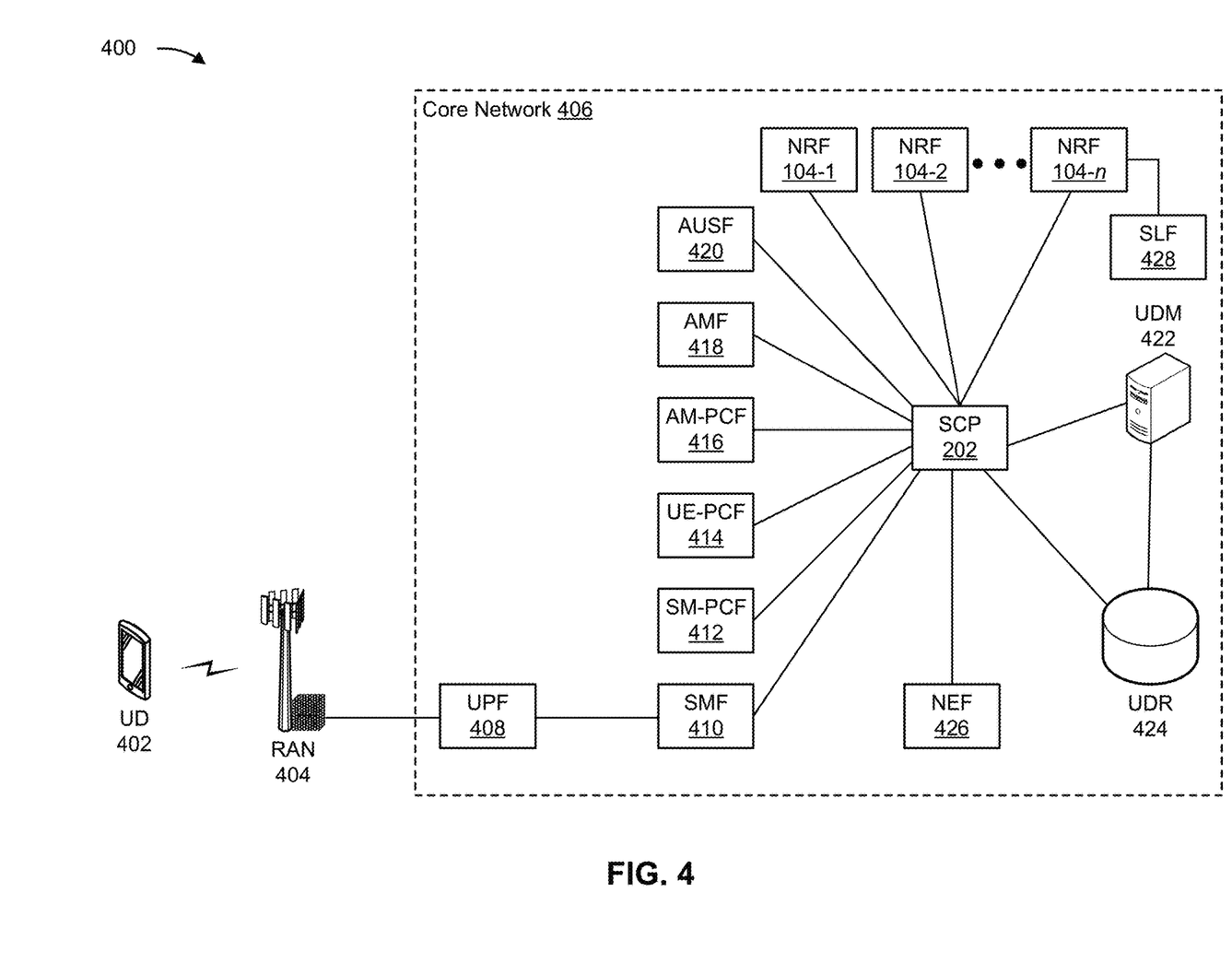
FIG. 4 is a diagram of an example environment in which systems and/or methods described herein may be implemented.

FIG. 4 is a diagram of an example environment 400 in which systems and/or methods described herein may be implemented. As shown in FIG. 4, example environment 400 may include a user device 402, a radio access network (RAN) 404 and a core network 406 (e.g., a 5G core network), among other examples. Devices and/or networks of example environment 400 may interconnect via wired connections, wireless connections, or a combination of wired and wireless connections.

As shown in FIG. 4, the user device 402 may communicate with the core network 406 via the RAN 404. For example, the user device 402 and the RAN 404 may communicate by exchanging wireless communications on a wireless communication link. The wireless communication link may include a downlink (e.g., a link from the RAN 404 to the user device 402) and an uplink (e.g., a link from the user device 402 to the RAN 404). The RAN 404 and the core network 406 may communicate on wired and/or wireless communication links.

The user device 402 includes one or more devices capable of receiving, generating, storing, processing, and/or providing information, such as information described herein. For example, the user device 402 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

The RAN 404 may support, for example, a cellular radio access technology (RAT). The RAN 404 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for user device 402. The RAN 404 may transfer traffic between the user device 402 (e.g., using a cellular RAT), one or more base stations (e.g., using a wireless interface or a backhaul interface, such as a wired backhaul interface), and/or the core network 406. The RAN 404 may provide one or more cells that cover geographic areas.

In some implementations, the RAN 404 may perform scheduling and/or resource management for the user device 402 covered by the RAN 404 (e.g., the user device 402 covered by a cell provided by the RAN 404). In some implementations, the RAN 404 may be controlled or coordinated by a network controller, which may perform load balancing, network-level configuration, and/or other operations. The network controller may communicate with the RAN 404 via a wireless or wireline backhaul. In some implementations, the RAN 404 may include a network controller, a self-organizing network (SON) module or component, or a similar module or component. In other words, the RAN 404 may perform network control, scheduling, and/or network management functions (e.g., for uplink, downlink, and/or sidelink communications of the user device 402 covered by the RAN 404).

In some implementations, the core network 406 may include an example functional architecture in which systems and/or methods described herein may be implemented. For example, the core network 406 may include an example architecture of a fifth generation (5G) next generation (NG) core network included in a 5G wireless telecommunications system. While the example architecture of the core network 406 shown in FIG. 4 may be an example of a service-based architecture, in some implementations, the core network 406 may be implemented as a reference-point architecture and/or a 4G core network, among other examples.

As shown in FIG. 4, the core network 406 may include a plurality of network function devices. For example, the core network 406 may include a user plane function (UPF) network function device (referred to as the UPF 408). As another example, the core network 406 may include an SMF network function device (referred to as the SMF 410). As another example, the core network 406 may include a session management policy control function (SM-PCF) network function device (referred to as the SM-PCF 412). As another example, the core network 406 may include a user equipment policy control function (UE-PCF) network function device (referred to as the UE-PCF 414). As another example, the core network 406 may include an access and mobility management policy control function (AM-PCF) network function device (referred to as the AM-PCF 416). As another example, the core network 406 may include an AMF network function device (referred to as the AMF 418).

As another example, the core network 406 may include an authentication server function (AUSF) network function device (referred to as the AUSF 420). As another example, the core network 406 may include a unified data management (UDM) network function device (referred to as the UDM 422), As another example, the core network 406 may include a unified data repository (UDR) network function device (referred to as the UDR 424). As another example, the core network 406 may include one or more NRF network function devices (referred to as the NRF(s) 104-1 through 104-n). As another example, the core network 406 may include a subscriber locator function (SLF) network function device (referred to as the SLF 428). As another example, the core network 406 may include a network exposure function (NEF) network function device (referred to as the NEF 426). As another example, the core network 406 may include an SCP network function device (referred to as the SCP 202).

In some implementations, the core network 406 includes additional network function devices, fewer network function devices, and/or a different combination of network function devices. In some implementations, one or more of the functional elements may be implemented on physical devices, such as an access point, a base station, and/or a gateway. In some implementations, one or more of the functional elements may be implemented on a computing device of a cloud computing environment. In some implementations, one or more of the functional elements may be implemented by one or more devices, such as one or more devices 500 illustrated and described in connection with FIG. 5. In some implementations, a consumer 102 may correspond to a UPF 408, an SMF 410, an SM-PCF 412, a UE-PCF 414, an AM-PCF 416, an AMF 418, an AUSF 420, a UDM 422, a UDR 424, an NEF 426, and/or an SLF 428 in the core network 406. In some implementations, a producer 204 may correspond to a UPF 408, an SMF 410, an SM-PCF 412, a UE-PCF 414, an AM-PCF 416, an AMF 418, an AUSF 420, a UDM 422, a UDR 424, an NEF 426, and/or an SLF 428 in the core network 406.

The network function devices in the core network 406 may communicate via various 5G network function interfaces on a message bus. The message bus represents a communication structure for communication among the functional elements. In other words, the message bus may permit communication between two or more functional elements. The network function devices included in the core network 406 may communicate on the message bus using one or more of the 5G network function interfaces. For example, network function devices in the core network 406 may communicate with the NRFs 104-1 through 104-n on an Nnrf 5G network function interface. As another example, network function devices in the core network 406 may communicate with the SCP 202 on an Nscp 5G network function interface. As another example, the network function devices may communicate with the UPF 408 on an N4 5G network function interface. The RAN 404 may communicate with the UPF 408 on an N3 5G network function interface.

As another example, network function devices in the core network 406 may communicate with the SMF 410 on an Nsmf 5G network function interface. The UPF 408 may communicate with the SMF 410 on an N4 5G network function interface. As another example, network function devices in the core network 406 may communicate with the SM-PCF 412 via an Npcf 5G network function interface. As another example, network function devices in the core network 406 may communicate with the UE-PCF 414 on an Npcf 5G network function interface. As another example, network function devices in the core network 406 may communicate with the AM-PCF 416 on an Npcf 5G network function interface. As another example, network function devices in the core network 406 may communicate with the AMF 418 on an Namf 5G network function interface. The RAN 404 may communicate with the UPF 408 on an N2 5G network function interface.

As another example, network function devices in the core network 406 may communicate with the AUSF 420 on an Nausf 5G network function interface. As another example, network function devices in the core network 406 may communicate with the UDM 422 on an Nudm 5G network function interface. As another example, network function devices may communicate with the NEF 426 via an Nnef 5G network function interface.

As further shown in FIG. 4, the network function devices 104, 410-422, and 426 may be communicatively connected with the SCP 202. This may be referred to as a Model D 5G signaling network model. In this particular 5G signaling network model, the SCP 202 functions as a centralized routing hub. The SCP 202 provides indirect communication between the network function devices 104, 410-422, and 426 and provides delegated discovery for the network function devices 104, 410-422, and 426. In other words, requests for discovery of other network function devices, that are typically provided directly to an NRF 104 by network function devices in the core network 406, are handled by the SCP 202. This enables load balancing in the core network 406 to be unified, enables real-time delivery of network function requests and responses, and/or enables optimized capacity in the core network 106, among other examples.

An NRF 104 includes one or more devices that provide a single record of all network functions available in the core network 406, together with a profile of each network function and services supported by each network function. An NRF 104 may allow other network functions to subscribe to, and get notified about, registration in the NRF 104 of new network function instances. In addition to maintaining profiles, an NRF 104 also supports service discovery functions, enabling other network functions to obtain information regarding available network functions that can support specific services.

The SCP 202 includes one or more devices that provide routing of requests and responses between network function devices in the core network 406. The SCP 202 may register with the NRF(s) 104-1 through 104-*n* in the core network 406. The SCP 202 may discover (e.g., using an NFDiscover message) the topology of the core network 406 from the NRF(s) 104-1 through 104-*n* and store the topology in cache at the SCP 202. The SCP 202 may create routing rules for network functions in the core network 106. The SCP 202 may subscribe to the NRF(s) 104-1 through 104-*n* in the core network 406 (e.g., using a NFStatusSubscribe message) to receive network function change notifications. The SCP 202 may periodically audit the NRF(s) 104-1 through 104-*n* for network function status changes. The SCP 202 may update the cache of the SCP 202 with network function information changes. The SCP 202 may perform service authentication for the network function devices in the core network 406, as described herein.

The UPF 408 includes one or more devices that serve as an anchor point for intraRAT and/or interRAT mobility. The UPF 408 may apply rules to packets, such as rules pertaining to packet routing, traffic reporting, and/or handling user plane QoS, among other examples.

The SMF 410 includes one or more devices that support the establishment, modification, and release of communication sessions in the wireless telecommunications system. For example, the SMF 410 may configure traffic steering policies at the UPF 108 and/or may enforce user equipment IP address allocation and policies, among other examples.

The PCF(s) may include one or more devices that provide a policy framework that incorporates network slicing, roaming, packet processing, and/or mobility management, among other examples. The PCF(s) may include an SM-PCF 412 (e.g., an SM-PCF network function device), a UE-PCF 414 (e.g., a UE-PCF network function device), and/or an AM-PCF 416 (e.g., an AM-PCF network function device), among other examples. The SM-PCF 412 may include one or more devices that provide a policy framework and maintain rules and policies for session management. The UE-PCF 414 may include one or more devices that provide a policy framework and maintain rules and policies for user devices 402. The AM-PCF 416 may include one or more devices that provide a policy framework and maintain rules and policies for access management.

The AMF 418 includes one or more devices that act as a termination point for non-access stratum (NAS) signaling and/or mobility management, among other examples.

The AUSF 420 includes one or more devices that act as an authentication server and support the process of authenticating the user device 402 in the wireless telecommunications system.

The UDM 422 includes one or more devices that maintain (e.g., update, store, provide) user data and profiles in the wireless telecommunications system. The UDM 422 may be used for fixed access and/or mobile access in the core network 406. The user data and profiles may be stored in the UDR 424, which includes a data repository for storing the user data and profiles.

The NEF 426 includes one or more devices that support exposure of capabilities and/or events in the wireless telecommunications system to help other entities in the wireless telecommunications system discover network services.

The SLF 428 includes one or more devices that store, maintain, and/or provide subscription information associated with a plurality of user profiles, such as a user profile associated with a user device 402. The subscription information may include an indication of a home subscriber slice (HSS) associated with a user profile, an indication of a UDM 422 and/or a UDR 424 to which the user profile is assigned, a UDM profile associated with the user profile, a subscriber profile associated with the user profile, and/or other subscriber information associated with the user profile.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of example environment 400 may perform one or more functions described as being performed by another set of devices of example environment 400.

Figure 5:
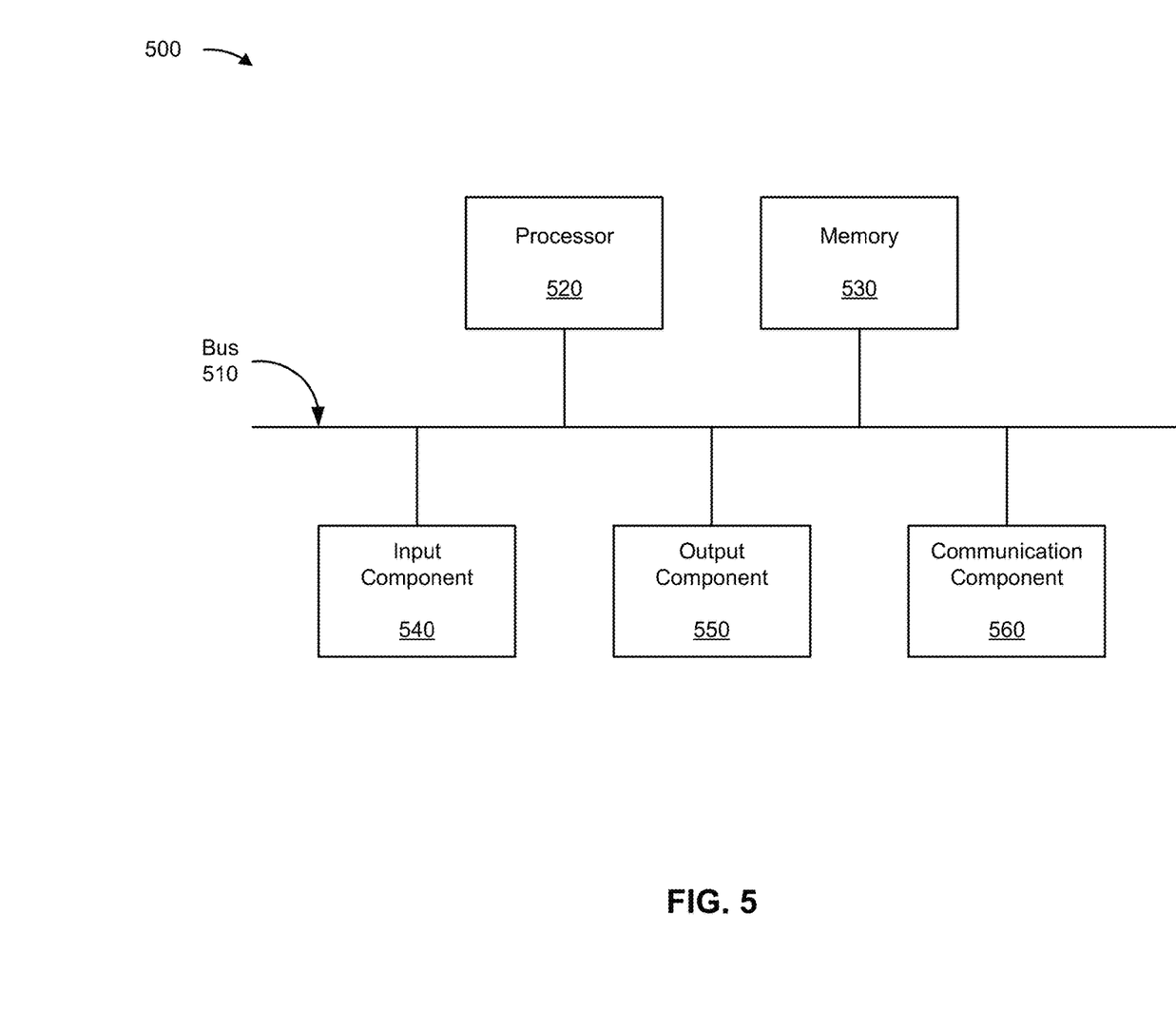
FIG. 5 is a diagram of example components of a device associated with service authorization.

FIG. 5 is a diagram of example components of a device 500 associated with service authorization. The device 500 may correspond to a consumer 102, an NRF 104, an SCP 202, a producer 204, a user device 402, one or more components in a RAN 404, a UPF 408, an SMF 410, an SM-PCF 412, a UE-PCF 414, an AM-PCF 416, an AMF 418, an AUSF 420, a UDM 422, a UDR 424, an NEF 426, and/or an SLF 428. In some implementations, a consumer 102, an NRF 104, an SCP 202, a producer 204, a user device 402, one or more components in a RAN 404, a UPF 408, an SMF 410, an SM-PCF 412, a UE-PCF 414, an AM-PCF 416, an AMF 418, an AUSF 420, a UDM 422, a UDR 424, an NEF 426, and/or an SLF 428 may include one or more devices 500 and/or one or more components of the device 500. As shown in FIG. 5, the device 500 may include a bus 510, a processor 520, a memory 530, an input component 540, an output component 550, and/or a communication component 560.

The bus 510 may include one or more components that enable wired and/or wireless communication among the components of the device 500. The bus 510 may couple together two or more components of FIG. 5, such as via operative coupling, communicative coupling, electronic coupling, and/or electric coupling. For example, the bus 510 may include an electrical connection (e.g., a wire, a trace, and/or a lead) and/or a wireless bus. The processor 520 may include a central processing unit, a graphics processing unit, a microprocessor, a controller, a microcontroller, a digital signal processor, a field-programmable gate array, an application-specific integrated circuit, and/or another type of processing component. The processor 520 may be implemented in hardware, firmware, or a combination of hardware and software. In some implementations, the processor 520 may include one or more processors capable of being programmed to perform one or more operations or processes described elsewhere herein.

The memory 530 may include volatile and/or nonvolatile memory. For example, the memory 530 may include random access memory (RAM), read only memory (ROM), a hard disk drive, and/or another type of memory (e.g., a flash memory, a magnetic memory, and/or an optical memory). The memory 530 may include internal memory (e.g., RAM, ROM, or a hard disk drive) and/or removable memory (e.g., removable via a universal serial bus connection). The memory 530 may be a non-transitory computer-readable medium. The memory 530 may store information, one or more instructions, and/or software (e.g., one or more software applications) related to the operation of the device 500. In some implementations, the memory 530 may include one or more memories that are coupled (e.g., communicatively coupled) to one or more processors (e.g., processor 520), such as via the bus 510. Communicative coupling between a processor 520 and a memory 530 may enable the processor 520 to read and/or process information stored in the memory 530 and/or to store information in the memory 530.

The input component 540 may enable the device 500 to receive input, such as user input and/or sensed input. For example, the input component 540 may include a touch screen, a keyboard, a keypad, a mouse, a button, a microphone, a switch, a sensor, a global positioning system sensor, an accelerometer, a gyroscope, and/or an actuator. The output component 550 may enable the device 500 to provide output, such as via a display, a speaker, and/or a light-emitting diode. The communication component 560 may enable the device 500 to communicate with other devices via a wired connection and/or a wireless connection. For example, the communication component 560 may include a receiver, a transmitter, a transceiver, a modem, a network interface card, and/or an antenna.

The device 500 may perform one or more operations or processes described herein. For example, a non-transitory computer-readable medium (e.g., memory 530) may store a set of instructions (e.g., one or more instructions or code) for execution by the processor 520. The processor 520 may execute the set of instructions to perform one or more operations or processes described herein. In some implementations, execution of the set of instructions, by one or more processors 520, causes the one or more processors 520 and/or the device 500 to perform one or more operations or processes described herein. In some implementations, hardwired circuitry may be used instead of or in combination with the instructions to perform one or more operations or processes described herein. Additionally, or alternatively, the processor 520 may be configured to perform one or more operations or processes described herein. Thus, implementations described herein are not limited to any specific combination of hardware circuitry and software.

The number and arrangement of components shown in FIG. 5 are provided as an example. The device 500 may include additional components, fewer components, different components, or differently arranged components than those shown in FIG. 5. Additionally, or alternatively, a set of components (e.g., one or more components) of the device 500 may perform one or more functions described as being performed by another set of components of the device 500.

Figure 6:
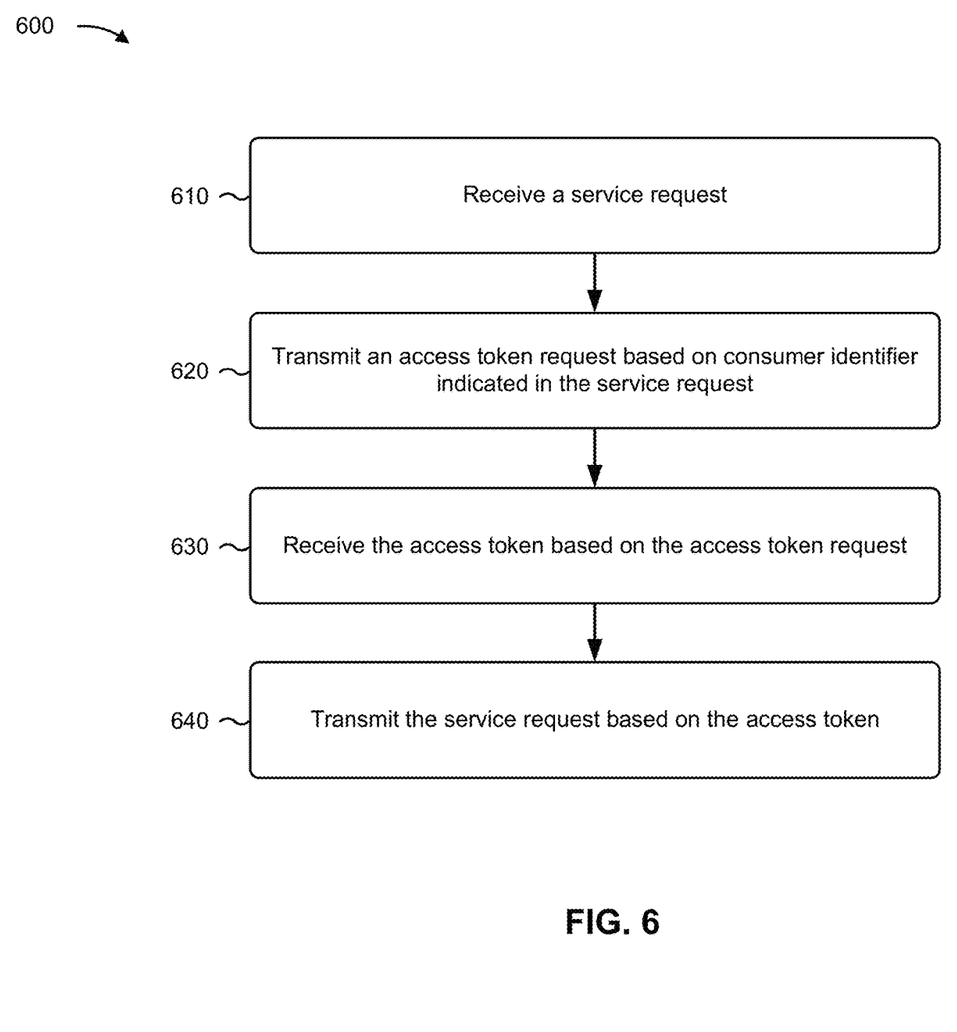
FIG. 6 is a flowchart of an example process associated with service authorization.

FIG. 6 is a flowchart of an example process 600 associated with service authorization. In some implementations, one or more process blocks of FIG. 6 may be performed by a network function device in a core network (e.g., a consumer 102, an NRF 104, an SCP 202, a producer 204, a user device 402, one or more components in a RAN 404, a UPF 408, an SMF 410, an SM-PCF 412, a UE-PCF 414, an AM-PCF 416, an AMF 418, an AUSF 420, a UDM 422, a UDR 424, an NEF 426, and/or an SLF 428). In some implementations, one or more process blocks of FIG. 6 may be performed by another device or a group of devices separate from or including the SCP network function device, such as a user device 402, one or more components included in a RAN 404, and/or another device. Additionally, or alternatively, one or more process blocks of FIG. 6 may be performed by one or more components of device 500, such as processor 520, memory 530, input component 540, output component 550, and/or communication component 560.

As shown in FIG. 6, process 600 may include receiving, from a first network function device, a service request associated with a second network function device (block 610). For example, the SCP network function device may receive, from a first network function device, a service request associated with a second network function device, as described herein. In some implementations, receiving the service request comprises receiving, from the first network function device, an indication of the CCA token in the service request.

In some implementations, receiving the service request includes receiving an indication that service authorization for the first network function device is delegated to the SCP network function device, and transmitting the access token request comprises transmitting, in the access token request, the indication that service authorization for the first network function device is delegated to the SCP network function device. In some implementations, the indication that service authorization for the first network function device is delegated to the SCP network function device includes a flag that is set in the access token request. In some implementations, receiving the service request includes receiving, from the first network function device, an oAuth2 service request.

In some implementations, the service request includes an indication of a CCA token associated with the first network function device that is based on the SCP network function device. In some implementations, the CCA token includes an SCP identifier associated with the SCP network function device. In some implementations, the SCP identifier includes an SCP FQDN associated with the SCP network function device. In some implementations, the CCA token further includes, in combination with the SCP identifier, at least one of a network function instance identifier associated with the first network function device, a timestamp, an expiration time, or a network function target associated with the service request.

As further shown in FIG. 6, process 600 may include transmitting an access token request to an NRF network function device (block 620). For example, the SCP network function device may transmit an access token request to a NRF network function device, as described herein. The NRF network function device may receive the access token request.

In some implementations, the access token request includes an indication of the CCA token associated with the first network function device, and the CCA token is based on the SCP network function device. In some implementations, the access token request includes an indication that service authorization for the first network function device is delegated to the SCP network function device.

As further shown in FIG. 6, process 600 may include receiving, based on the access token request, an access token associated with the first network function device (block 630). For example, the SCP network function device may receive, based on the access token request, an access token associated with the first network function device, as described herein. The NRF network function device may transmit the access token to the SCP network function device.

In some implementations, the NRF network function device may validate the access token request, and may generate the access token based on validating the access token request. In some implementations, the NRF network function device may validate the access token request based on the CCA token associated with the first network function device.

In some implementations, to validate the access token request, the NRF network function device may determine that the access token request is from the SCP network function device, and may validate the access token request based on determining that the access token request is from the SCP network function device.

In some implementations, to validate the access token request, the NRF network function device may determine that the access token request is from the SCP network function device, may determine that the CCA token includes an SCP identifier associated with the SCP network function device, and may validate the access token request based on determining that the access token request is from the SCP network function device and based on determining that the CCA token includes the SCP identifier associated with the SCP network function device.

In some implementations, to validate the access token request, the NRF network function device may determine that the access token request includes the indication that service authorization for the first network function device is delegated to the SCP network function device; determine, based on determining that the access token request includes the indication that service authorization for the first network function device is delegated to the SCP network function device, that the access token request is from the SCP network function device; determine, based on determining that the access token request includes the indication that service authorization for the first network function device is delegated to the SCP network function device, that the CCA token includes an SCP identifier associated with the SCP network function device; and validate the access token request based on determining that the access token request is from the SCP network function device and based on determining that the CCA token includes the SCP identifier associated with the SCP network function device.

In some implementations, SCP network function device may transmit, and the NRF network function device may receive, a request for a network function profile associated with the second network function device. The request for the network function profile may be based on receiving the access token. In some implementations, the SCP network function device may receive, and the NRF network function device may transmit, the network function profile based on the request for the network function profile.

As further shown in FIG. 6, process 600 may include transmitting the service request to the second network function device based on the access token (block 640). For example, the SCP network function device may transmit the service request to the second network function device, as described herein. In some implementations, the service request is transmitted to the second network function device with an indication of the access token.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
receiving, by a service communication proxy (SCP) network function device and from a first network function device, a service request associated with a second network function device,
wherein the service request includes a client credentials assertion (CCA) token generated by the first network function device;
transmitting, by the SCP network function device, an access token request to a network repository function (NRF) network function device,
wherein the access token request includes an indication of the CCA token;
receiving, by the SCP network function device and based on the access token request, an access token associated with the first network function device,
wherein the access token is different from the CCA token, and
wherein prior to the access token being generated, the CCA token is validated based on determining that the access token request includes an indication that service authorization for the first network function device is delegated to the SCP; and
transmitting, by the SCP network function device, the service request to the second network function device,
wherein the service request is transmitted to the second network function device with an indication of the access token.

2. The method of claim 1, wherein the CCA token includes an SCP identifier associated with the SCP network function device.

3. The method of claim 1, wherein the indication that service authorization for the first network function device is delegated to the SCP network function device comprises a flag that is set in the access token request.

4. The method of claim 1, wherein receiving the service request comprises:
receiving, from the first network function device, an open authorization 2.0 (oAuth2) service request.

5. The method of claim 1, wherein receiving the service request comprises:
receiving an indication that service authorization for the first network function device is delegated to the SCP network function device.

6. The method of claim 1, wherein the CCA token is based on the SCP network function device.

7. The method of claim 1, wherein the CCA token is validated further based on determining that the access token request is from the SCP network function device and based on determining that the CCA token includes an SCP identifier associated with the SCP network function device.

8. A non-transitory computer-readable medium storing a set of instructions, the set of instructions comprising:
one or more instructions that, when executed by one or more processors of a service communication proxy (SCP) network function device, cause the SCP network function device to:
receive, from a first network function device, a service request associated with a second network function device,
wherein the service request comprises:
an indication that service authorization for the first network function device is delegated to the SCP network function device, and
an indication of a client credentials assertion (CCA) token associated with the first network function device that includes an SCP identifier associated with the SCP network function device;
transmitting, by the SCP network function device, an access token request to a network repository function (NRF) network function device,
wherein the access token request comprises:
the indication that service authorization for the first network function device is delegated to the SCP network function device, and
the indication of the CCA token; and
receive, by the SCP network function device and based on the access token request, an access token associated with the first network function device, wherein the access token is different from the CCA token, and wherein prior to the access token being generated, the CCA token is validated based on determining that the access token request includes an indication that service authorization for the first network function device is delegated to the SCP.

9. The non-transitory computer-readable medium of claim 8, wherein the SCP identifier comprises an SCP fully qualified domain name (FQDN) associated with the SCP network function device.

10. The non-transitory computer-readable medium of claim 8, wherein the CCA token further includes, in combination with the SCP identifier, at least one of:
a network function instance identifier associated with the first network function device,
a timestamp,
an expiration time, or
a network function target associated with the service request.

11. The non-transitory computer-readable medium of claim 8, wherein the service request, received from the first network function device, includes a field in which a flag is set as the indication that service authorization for the first network function device is delegated to the SCP network function device.

12. The non-transitory computer-readable medium of claim 8, wherein the one or more instructions, when executed by the one or more processors, further cause the SCP network function device to:
transmit the service request to the second network function device,
wherein the service request is transmitted to the second network function device with an indication of the access token.

13. The non-transitory computer-readable medium of claim 8, wherein the one or more instructions, when executed by the one or more processors, further cause the SCP network function device to:
transmit, to the NRF network function device and based on receiving the access token, a request for a network function profile associated with the second network function device; and
receive, from the NRF network function device, the network function profile based on the request for the network function profile.

14. A device, comprising:
one or more memories; and
one or more processors, coupled to the one or more memories, configured to:
receive, from a first network function device, a service request associated with a second network function device,
wherein the device is associated with a service communication proxy (SCP) network function device, and
wherein the service request includes a client credentials assertion (CCA) token generated by the first network function device;
transmit an access token request to a network repository function (NRF) network function device,
wherein the access token request includes an indication of the CCA token;
receive, based on the access token request, an access token associated with the first network function device,
wherein the access token is different from the CCA token, and
wherein prior to the access token being generated, the CCA token is validated based on determining that the access token request includes an indication that service authorization for the first network function device is delegated to the SCP; and
transmit the service request to the second network function device,
wherein the service request is transmitted to the second network function device with an indication of the access token.

15. The device of claim 14, wherein the CCA token includes an SCP identifier associated with the SCP network function device.

16. The device of claim 14, wherein the indication that service authorization for the first network function device is delegated to the SCP network function device comprises a flag that is set in the access token request.

17. The device of claim 14, wherein the one or more processors, to receive the service request, are configured to:
receive, from the first network function device, an open authorization 2.0 (oAuth2) service request.

18. The device of claim 14, wherein the one or more processors, to receive the service request, are configured to:
receive an indication that service authorization for the first network function device is delegated to the SCP network function device.

19. The device of claim 14, wherein the CCA token is based on the SCP network function device.

20. The device of claim 14, wherein the CCA token is validated further based on determining that the access token request is from the SCP network function device and based on determining that the CCA token includes an SCP identifier associated with the SCP network function device.

* * * * *